United States Patent
Kyojima et al.

(10) Patent No.: US 6,996,723 B1
(45) Date of Patent: Feb. 7, 2006

(54) DATA GENERATING APPARATUS AND DATA VERIFYING APPARATUS

(75) Inventors: Masaki Kyojima, Nakai-machi (JP); Kil-ho Shin, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 928 days.

(21) Appl. No.: 09/588,049

(22) Filed: Jun. 6, 2000

(30) Foreign Application Priority Data

Aug. 10, 1999 (JP) ................................. 11-226380

(51) Int. Cl.
*H04L 9/32* (2006.01)
*G06F 11/30* (2006.01)
*G06F 12/14* (2006.01)

(52) U.S. Cl. .................... 713/193; 713/189; 380/45
(58) Field of Classification Search ................ 713/189, 713/193; 380/45
See application file for complete search history.

(56) References Cited

U.S. PATENT DOCUMENTS

| | | | |
|---|---|---|---|
| 5,502,766 A | * | 3/1996 | Boebert et al. ............. 713/193 |
| 5,689,565 A | * | 11/1997 | Spies et al. ................. 713/189 |
| 5,757,920 A | * | 5/1998 | Misra et al. ................. 713/158 |
| 6,496,928 B1 | * | 12/2002 | Deo et al. ..................... 713/153 |

OTHER PUBLICATIONS

"Computer Communications Security" W. Ford, Prentice Hall P T R, 1994, pp. 75-81.

* cited by examiner

*Primary Examiner*—Gilberto Barron, Jr.
*Assistant Examiner*—Benjamin E. Lanier
(74) *Attorney, Agent, or Firm*—Oliff & Berridge, PLC

(57) ABSTRACT

Integrity of data is to be ensured in a simple manner. A data verifier generates a signature generation request from data to be signed and signature request time, and sends the request to a data generator. The data generator extracts the data to be signed from the signature generation request, and its signature generation unit generates a signature for the data. A key generation unit generates a key from a previous key, the signature request time in the signature generation request, and the identifier of the data generator, and an encryptor encrypts the signature. After that, the encrypted signature and the like are returned to the data verifier, which generates a decrypting key with a key generation unit from the previous key, the signature request time, and the identifier of the data generator, then extracts an encrypted signature, and decrypts it with a decryptor. A signature verification unit checks whether or not the result of decrypting is the correct signature.

26 Claims, 10 Drawing Sheets

FIG.10

DATA FOR MAIN CHECKING

```
<HTML>
  <HEAD>
    <TITLE>
      xxxxxxxxxxxxxxxxx
    </TITLE>
  </HEAD>
  <BODY>

</BODY>
</HTML>
```

DATA FOR SECONDARY CHECKING

DATA GENERATING APPARATUS AND DATA VERIFYING APPARATUS

BACKGROUND OF THE INVENTION

1. Field of the Invention

The present invention relates to data generating and data verifying techniques, and more particularly to a technique which enables checking the integrity or identity of data in a simple procedure between parties exchanging the data which is encrypted and decrypted for being verified.

2. Description of the Prior Art

In one of known cryptological methods for ensuring the integrity of a message, data for checking the integrity is appended to the body of the message. The data to be appended for this purpose is called a message authentication code (MAC) or a seal (hereinafter referred to as MAC).

An integrity checking method using a MAC will be described below.

(1) The originator and the intended receiver of a message share a secret key k and an algorithm H( ) for use in generating a MAC.

(2) The originator of the message generates a MAC, $\sigma = H(m, k)$ from the message m, and appends $\sigma$ to m, which is then sent to the intended receiver.

(3) The receiver, having received the message m to which MAC $\sigma$ is appended, checks whether or not $H(m, k)$ is equal to $\sigma$ and, if it is, will be convinced of the integrity of the message.

Such a method is disclosed, for instance, in Warwick Ford, *Computer Communication Security*, Prentice Hall, 1994, PP. 75–80.

According to the prior art, the need to append a MAC entails an increase in the volume of data over the message itself. Usually such a cryptological hash algorithm as MD5 (message digest 5) or SHA-1 (secure hash algorithm) is used as H( ), and a MAC generated thereby has 16 bytes by MD5 or 20 bytes by SHA-1.

This much increase poses no significant problem if the message is sent in a high speed communication environment or the size of message is big compared with the size of MAC. But in the case where a small volume of data is to be sent in a low speed communication environment, the increase cannot be ignored.

SUMMARY OF THE INVENTION

The invention proposed hereby is effective where a message contains data which has a prescribed characteristic, that is, the data is known to satisfy a specific condition which can be checked by the receiver.

For instance, the specific condition may be that data have such a degree of redundancy that a specific pattern is reiterated or the data satisfy a specific verification formula, as the signature value of a digital signature does.

A data generating apparatus according to the present invention generates data including data-for-main-checking which is data having a prescribed characteristic which is verifiable and data for secondary checking which in itself need not have any specific characteristic (it may have some characteristic but need not). The data generating apparatus has an encryptor, which encrypts the data for main checking. The key for encrypting is generated by an encrypting key generation unit of the data generating apparatus from the data for secondary checking held in the data generating apparatus.

A data verifying apparatus for checking the integrity of the data generated by the data generating apparatus has a decrypting key generation unit having the same key generating algorithm as the encrypting key generation unit of the data generating apparatus, and further has a verification unit for verifying if the value verified has the prescribed characteristic.

This data verifying apparatus, when verifying data, generates a decrypting key from the data for secondary checking, decrypts the encrypted data for main checking with this key, and verifies if the result of decrypting manifests the prescribed characteristic.

If the data generating apparatus is aware that the data verifying apparatus holds part of the data for secondary checking, the data generating apparatus need not send all the data for secondary checking it possesses.

If this checking fails to verify the data, the data verifying apparatus will know one of the following events has occurred:

1. The data for secondary checking held by the data verifying apparatus is different from that held by the data generating apparatus. In other words, the two apparatuses have failed to share the same data for secondary checking.

2. Where, for instance, data for secondary checking is shared through sending/reception between the verifier and the data generating apparatus, some replacement may have occurred in the process of sending/reception.

3. Or, if the data generating apparatus supposes that the data verifying apparatus holds part of the data for secondary checking and does not send such data, the data verifying apparatus may not have the same data as the data generating apparatus supposes it has.

4. The data generating apparatus itself cannot generate data for main checking having a prescribed characteristic. For instance, if what can create data for main checking having the prescribed characteristic is restricted to what has specific information, the data generating apparatus may not fit that qualification.

According to this system, in the data generated by the data generating apparatus, information corresponding to MAC for ensuring integrity is convoluted into the encrypted data for main checking, and appending of MAC to the data is thereby eliminated.

It is usual for the encrypting key generator or the decrypting key generator for the present invention to include a one-way function.

Where a one-way hash function whose algorithm is public, such as MD5 or SHA-1, it can ensure that there is no problem with data generated by the data generating apparatus according to the invention unless the data is altered on purpose.

If a secret one-way function is used, it can be checked if the data has been generated by a data generating apparatus possessing that secret one-way function. Intentional alteration by anybody other than the parties sharing the one-way function can be prevented. It has to be noted, though, that only a data verifying apparatus that shares the same secret one-way function can perform this checking.

An additional advantage of this configuration is that it enables the data for main checking to be kept secret from those other than the parties shearing the secret one-way function.

Though the shared one-way function is not secret, the same effect can also be achieved by having the data generating apparatus and the data verifying apparatus share secret data (hereinafter called "previous key") and use the previous key when generating an encrypting key or a decrypting key.

Although it is only a data verifying apparatus sharing the same previous key that can perform checking by this method, any data verifying apparatus can be enabled to do data checking by having a data generating apparatus send the previous key to the data verifying apparatus. Obviously the previous key sent to a data verifying apparatus should have been encrypted, but if public key encryption is used for that encrypting, any data verifying apparatus whose encrypting key is public can execute data verification.

According to the invention, there is provided, for low-cost verification of the integrity of data, a data processing apparatus having a data generating apparatus and a data verifying apparatus for verifying the integrity of data generated by the generating apparatus. The data verifying apparatus is provided with a reference value memory unit for holding first data; a first data-for-secondary-checking memory unit for holding second data; a decrypting key generation unit for generating a decrypting key from the data stored in the first data-for-secondary-checking memory unit; a decryptor for decrypting data sent from the data generating apparatus with the decrypting key generated by the decrypting key generation unit; and a check unit for checking that the data decrypted by the decryptor are in a prescribed relationship with the first data stored in the reference value memory. The data generating apparatus is provided with a data-for-main-checking generation unit for generating third data from the first data sent from the data verifying apparatus; a second data-for-secondary-checking memory unit for holding fourth data; an encrypting key generation unit for generating an encrypting key from the data stored in the second data-for-secondary-checking memory unit; and an encryptor for encrypting the third data generated by the data-for-main-checking generation unit with the encrypting key generated by the encrypting key generation unit. The data verifying apparatus sends the first data stored in the reference value memory unit to the data generating apparatus; the data generating apparatus generates, with its data-for-main-checking generation unit, the third data from the first data sent from the data verifying apparatus, and sends to the data verifying apparatus data generated by encrypting the third data with the encryptor; and the data verifying apparatus decrypts with the decryptor the data sent from the data generating apparatus, and checks with the check unit that the result of decrypting is in a prescribed relationship with the first data stored in the reference value memory unit.

According to this configuration, since the verification of the data for secondary checking is convoluted into the procedure of verifying the data-for-main-checking, which is taking place concurrently, there is no need for separate verification of the data for secondary checking, nor is required to add a MAC or the like.

Incidentally, the data generated by the data generating apparatus may contain both the result of encrypting by the encryptor and the content of the second data-for-secondary-checking memory unit. Alternatively, the data generating apparatus may generate at separate timings data containing the result of encrypting by the encryptor and the content of the second data-for-secondary-checking memory unit, and cause these to be sent to the data verifying apparatus at different timings.

It may be so disposed that the data for secondary checking may be sent from either apparatus, or may be sent from a third party to both the data generating apparatus and the data verifying apparatus. This configuration is also applicable to cases where one part of the data comes from the data generating apparatus, another part from the data verifying apparatus and still another part from some other source.

Further according to this configuration, the third data generated by the data generating apparatus may be the product of decrypting with a prescribed decrypting key the first data sent from the data verifying apparatus, and the verification unit of the data verifying apparatus may check that the result of decrypting of data sent from the data generating apparatus is the result of decrypting the first data.

Alternatively, the third data generated by the data generating apparatus may be a signature generated by signing with a prescribed signature key the first data sent from the data verifying apparatus, and the verification unit of the data verifying apparatus may check if the result of decrypting the data sent from the data generating apparatus is a correct signature of the first data.

The data generating apparatus may be further provided with a first commitment random number memory unit for holding random numbers and a commitment generation unit for generating a commitment value from a random number; the data verifying apparatus may be further provided with a commitment information memory unit for storing a commitment value sent from the data generating apparatus; the data generating apparatus may send, before it receives the first data from the data verifying apparatus, the commitment value generated by the commitment generation unit to the data verifying apparatus and, the generation unit for data-for-main-checking, when it is to generate the third data, which is to be verified, may also use a random value stored in the commitment random number memory unit; and the data verifying apparatus, when its check unit performs checking, may also use the commitment value stored in the commitment information memory unit.

Further, the decrypting key generation unit of the data verifying apparatus may include a one-way function; the result of entering into the one-way function data stored in the first data-for-secondary-checking memory unit is the decrypting key; the encrypting key generation unit of the data generating apparatus may include the same one-way function as that of the decrypting key generator of the data verifying apparatus; and the result of entering into the one-way function data stored in the second data-for-secondary-checking memory unit is the encrypting key.

The data verifying apparatus may further have a first previous key memory unit for holding a previous key; the decrypting key generation unit, when it is to generate the decrypting key, also uses the previous key stored in the first previous key memory unit; and the data generating apparatus may further have a second previous key memory unit for holding the previous key; the encrypting key generation unit, when it is to generate the encrypting key, also uses the previous key stored in the second previous key memory unit.

Another conceivable configuration is that the data generating apparatus is provided with a previous key encrypting key memory unit for storing a previous encrypting key for encrypting the previous key, and a previous key encryptor for encrypting the previous key with an encrypting key stored in the previous key encrypting key memory unit; the data verifying apparatus is provided with a previous key decrypting key memory unit for storing a previous decrypting key for decrypting the encrypted previous key, and a previous key decryptor for decrypting the encrypted previous key with a previous key decrypting key stored in the previous key decrypting key memory unit; the data generating apparatus determines the previous key, encrypts with the previous key encryptor the previous key using the encrypting key stored in the previous key encrypting key memory unit, and sends the result to the data verifying apparatus; the data verifying apparatus decrypts with the previous key decryptor the encrypted previous key, sent from the data generating apparatus, using the decrypting key stored in the previous key decrypting key memory unit, and stores the result into the previous key memory unit.

Alternatively, the data verifying apparatus may send data held in the first data-for-secondary-checking memory unit to the data generating apparatus, and the data generating apparatus stores into the second data-for-secondary-checking memory unit the data sent from the data verifying apparatus for use in generation of an encrypting key generated by the encrypting key generation unit of the data generating apparatus.

The data generating apparatus may send to the data verifying apparatus data held in the second data-for-secondary-checking memory unit, and the data verifying apparatus stores the data sent from the data generating apparatus into the first data-for-secondary-checking memory unit for use in generation of a decrypting key generated by the decrypting key generation unit of the data verifying apparatus.

The encrypting algorithm performed by the encryptor may as well be a symmetric key algorithm, and the decrypting algorithm performed by the decryptor is the same algorithm used by the encryptor.

The encrypting performed by the encryptor may be multiplication or division using the third data and the encrypting key under a prescribed modulus number, and the decrypting performed by the decryptor may be multiplication or division using the data sent from the data generating apparatus by the decrypting key under the same prescribed modulus number as used in the encryptor.

The present invention can as well be realized as a data generating apparatus or a data verifying apparatus, or as a method forgenerating or verifying data. Also, at least a part of the invention can be realized as a computer program product.

BRIEF DESCRIPTION OF THE DRAWINGS

These and other features and advantages of the invention will become more apparent when taken in conjunction with the accompanying drawings, wherein:

FIG. 10 illustrates a variation of the second preferred embodiment of the invention.

DETAILED DESCRIPTION OF THE PREFERRED EMBODIMENTS

Preferred embodiments of the present invention will be described in detail below.

First Embodiment

Figure 1:
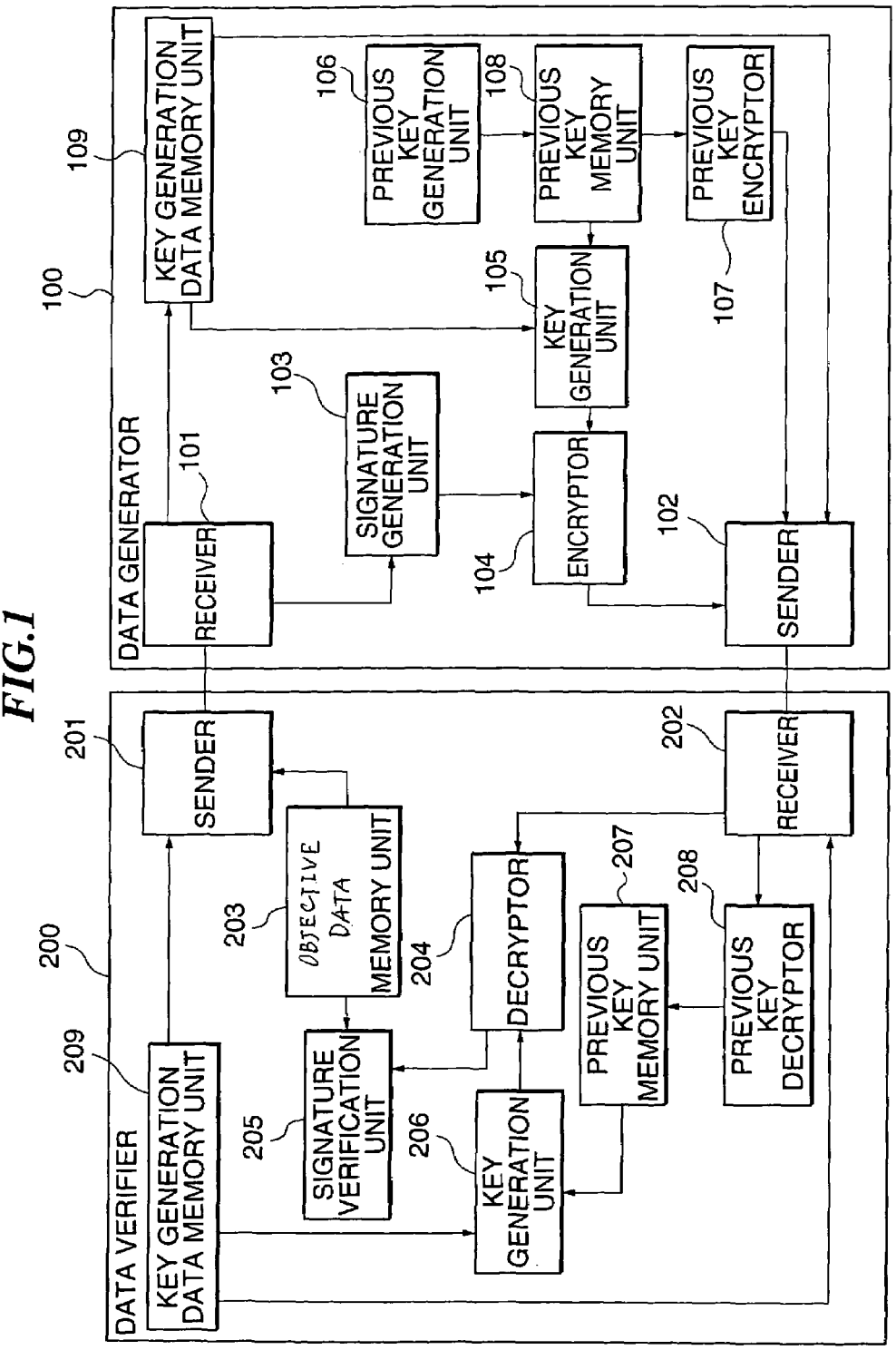
FIG. 1 is a block diagram illustrating the overall configuration of a first preferred embodiment of the invention.

FIG. 1 illustrates the configuration of a first preferred embodiment of the invention.

This embodiment is a system including a data generator 100 which generates data, and a data verifier 200 which verifies the integrity of the data generated by the data generator 100. Data is sent and received between the data generator 100 and the data verifier 200 possibly via the Internet, an intranet, a telephone line, by inter-process communication within the same computer or otherwise. The basic functions are that the data generator 100 calculates a signature for data sent by the data verifier 200 and sends the signature back to the data verifier 200.

It is also possible in this process of data sending/reception to send information from the data verifier 200 to the data generator 100 and to send information in the reverse direction. More specifically, information on the day and hour of requesting signature can be sent from the data verifier 200 to the data generator 100, and the identifier of the data generator 100 having generated the signature can be sent from the data generator 100 to the data verifier 200.

In this process, the data verifier 200 can confirm that the information it sent has reached the data generator 100 without being altered, that the data generator 100 having sent the information is the same data generator 100 that generated the signature, and that the data is not altered.

The roles of modules contained in the data generator 100 will be described below.

[Receiver 101] Receives data sent from the data verifier 200 and, after converting it from a communication format into a format within the data generator 100, allocates the received data to other modules within the data generator 100.

[Sender 102] Converts data received from modules in the data generator 100 into a format suitable for communication, and sends the converted data to the data verifier 200.

[Signature generation unit 103] This is a module to generate a signature for a signature-endorsed value (data to be signed) sent via the receiver 101 from the data verifier 200. A signature generated by the data generator 100 in this embodiment derives from the affixation of an RSA (Rivest-Shamir-Adleman) signature to the result of application of SHA-1 to a signature-endorsed value sent from the data verifier 200. The signature generation unit 103 has a program for executing SHA-1 hashing and an RSA signature key built into it.

[Encryptor 104] This is a module to encrypt a signature generated by the signature generation unit 103. Encrypting by this module is a remainder computation between the key generated by the key generation unit 105 and the signature generated by the signature generation unit 103 under the same RSA modulus number used by the decryptor 204 of the data verifier 200 for decrypting.

[Key generation unit 105] This is a module to generate an encrypting key for use by the encryptor 104. This module includes a one-way hash function such as SHA-1. Application of the hash function to a previous key stored in a previous key memory unit 108 to be described below and data stored in a key generation data memory unit 109 results in the encrypting key.

[Previous key generation unit 106] This is a module to generate a previous key for use in the generation of a key by the key generation unit 105. The previous key is generated using a random number generator or the like, so that the generated previous key cannot be foreseen by any aggressor.

The previous key is sent to the data verifier 200, and shared by the data generator 100 and the data verifier 200. As long as it is shared, there is no need to send the previous key to the data verifier 200. It is determined by the previous key generation unit 106 when to end the sharing and to send a new previous key to the data verifier 200. For this reason, the previous key generation unit 106 has a built-in clock, and generates a new previous key after a certain length of time has passed since the last sending of a previous key.

[Previous key encryptor 107] This is a module to encrypt a previous key, and to send the resultant encrypted previous key to the sender 102. Encrypting by this module uses RSA encrypting. The module has a program for executing RSA encrypting and an encrypting key built into it.

[Previous key memory unit 108] This is a module which stores a previous key generated by the previous key generation unit 106. The previous key stored in this module is referenced when the key generation unit 105 generates a key and when the previous key encryptor 107 encrypts a previous key.

[Key generation data memory unit 109] This is a module that stores data to be used when the key generation unit 105 generates a key. More specifically, the module stores information on the day and hour of requesting signature and the identifier of this data generator 100. The former data is sent from the data verifier 200. The latter data is embedded into the key generation data memory unit 109, and sent via the sender 102 to the data verifier 200.

The roles of modules contained in the data verifier 200 will be described below.

[Sender 201] Converts data into a format suitable for communication, and sends the converted data to the data generator 100.

[Receiver 202] Receives data sent from the data generator 100 and, after converting them from a communication format into a format within the data verifier 200, allocates the received data to other modules within the data verifier 200.

[Objective data memory unit 203] This module stores data to be signed by the data generator 100. The data stored herein is sent via the sender 201 to the data generator 100. A signature verification unit 205 is referenced when verifying a signature generated by the data generator 100.

[Decryptor 204] This is a module that decrypts an encrypted signature contained in data sent from the data generator 100. The decrypting performed here is a computation to divide the encrypted signature by a key generated by the key generation unit 206 under an RSA modulus number used for verifying a signature by the signature verification unit 205.

[Signature verification unit 205] This is a module which checks the integrity of the signature decrypted by the decryptor 204. This module has, built into it, a program for executing SHA-1 and a verification key matching a signature key held by the signature generation unit 103 of the data generator 100. It verifies the correctness of the signature according to whether or not the result of applying SHA-1 to data stored in the objective data memory unit 203 is identical with the result of power residue computation of the signature with the verification key.

[Key generation unit 206] This is a module that generates a decrypting key for use by the decryptor 204. It includes the same hash function held by the key generation unit 105 of the data generator 100. The result of applying this hash function to the previous key stored in a previous key memory unit 207 to be described below and data stored in the key generation data memory unit 209 is the key.

[Previous key memory unit 207] This is a module which stores a previous key decrypted by a previous key decryptor 208. The previous key stored in this module is referenced when the key generation unit 206 generates a key.

[Previous key decryptor 208] The previous key is sent in an encrypted data from the data generator 100. This module decrypts the encrypted previous key. Decrypting by this module uses RSA decrypting. The decrypting key for that is matching with the encrypting key held by the previous key encryptor 107 of the data generator 100, and this module has this decrypting key built into it.

[Key generation data memory unit 209] This is a module which stores data for use in generation of a key by the key generation unit 206. More specifically, the module stores information on the day and hour of requesting signature and the identifier of the data generator 100 having generated the signature. The former data is taken out of a clock accompanying the data verifier 200. The latter data is sent from the data generator 100 together with a signature.

The operations of this embodiment of the invention will be described below.

Roughly said, this embodiment takes steps that the data verifier 200 sends to the data generator 100 data including data to be signed (hereinafter called a "signature generation request"), that the data generator 100 returns to the data verifier 200 data including a signature (hereinafter called "signature data"), and that the data verifier 200 checks the integrity of the signature data.

The operation that takes place when the data verifier 200 generates a signature generation request. The procedure itself is not illustrated because it is simple.

[Premise] The operation starts in a state wherein data to be signed is stored in the objective data memory unit 203.

[Step 1] The data verifier 200 extracts current time information out of the clock built into it, and stores it into the key generation data memory unit 209 as the signature request time.

[Step 2] A signature generation request is generated from data to be signed stored in the objective data memory unit 203 and the signature request time stored in the key generation data memory unit 209, and is sent from the sender 201 to the data generator 100.

Figure 2:
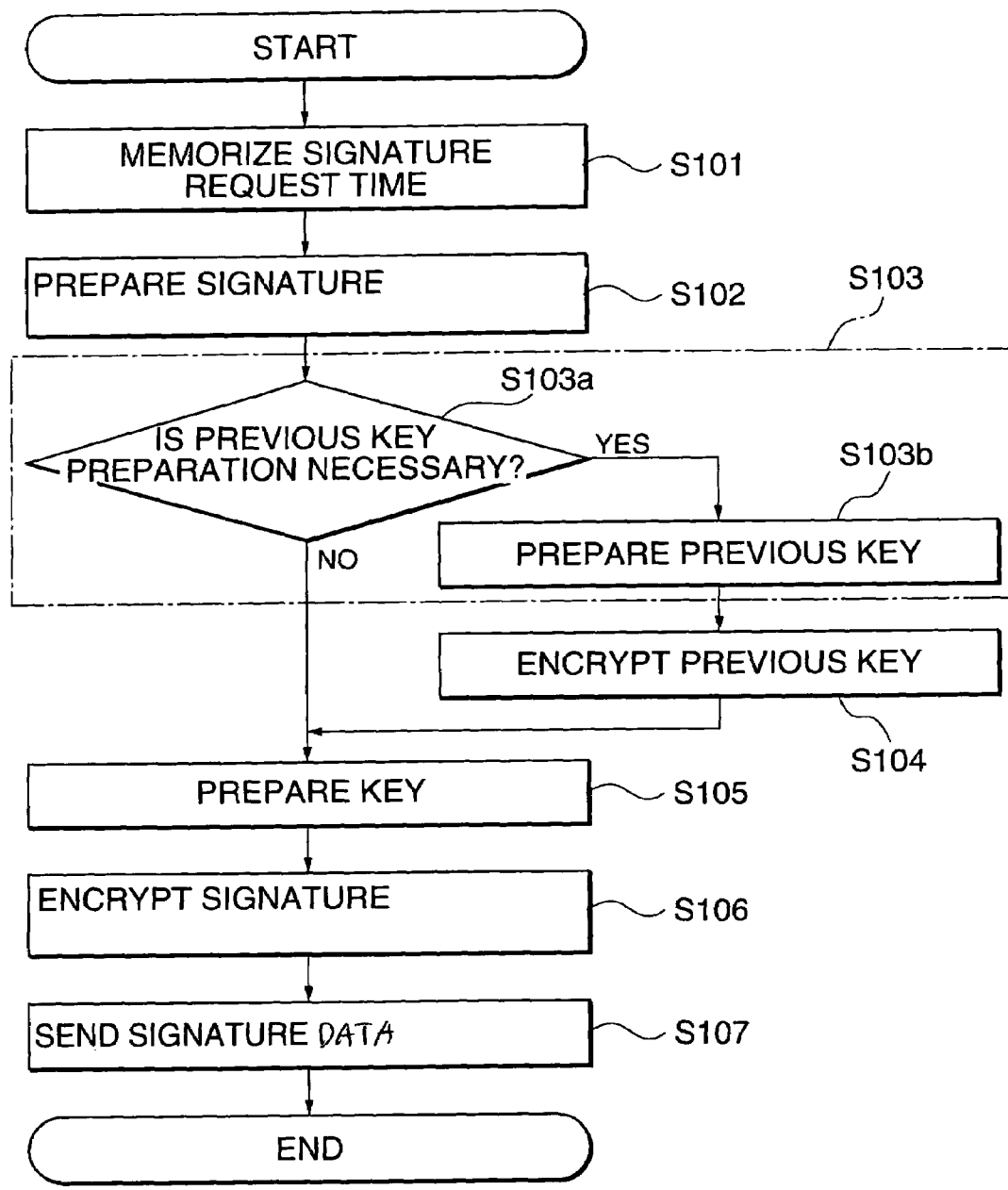
FIG. 2 is a flowchart for describing data generation by the first embodiment of the invention.

The operation of the data generator 100 having received the signature generation request will be described below. The procedure of this operation is illustrated in the flowchart of FIG. 2.

[Step S101] The signature request time is taken out of the signature generation request received by the receiver 101, and stored into the key generation data memory unit 109.

[Step S102] The data to be signed is extracted from the signature generation request received by the receiver 101 and sent to the signature generation unit 103, which generates a signature for the data.

[Step S103] If a new previous key has to be generated, the previous key generation unit 106 generates the previous key, and stores it into the previous key memory unit 108. If no new previous key is needed, the procedure will go ahead to step S105.

[Step S104] The previous key encryptor 107 encrypts the previous key stored in the previous key memory unit 108.

[Step S105] The key generation unit 105 generates a key from the previous key stored in the previous key memory unit 108, the day and hour of requesting signature stored in the key generation data memory unit 109, and the identifier of the data generator 100 stored in the key generation data memory unit 109.

[Step S106] The signature generated by the signature generation unit 103 is encrypted by the encryptor 104, using a key generated by the key generation unit 105.

[Step S107] Signature data is generated from the signature encrypted by the encryptor 104, a previous key, if any, encrypted by the previous key encryptor 107, and the identifier of this data generator 100 stored in the key generation data memory unit 109, and are sent from the sender 102 to the data verifier 200.

Figure 3:
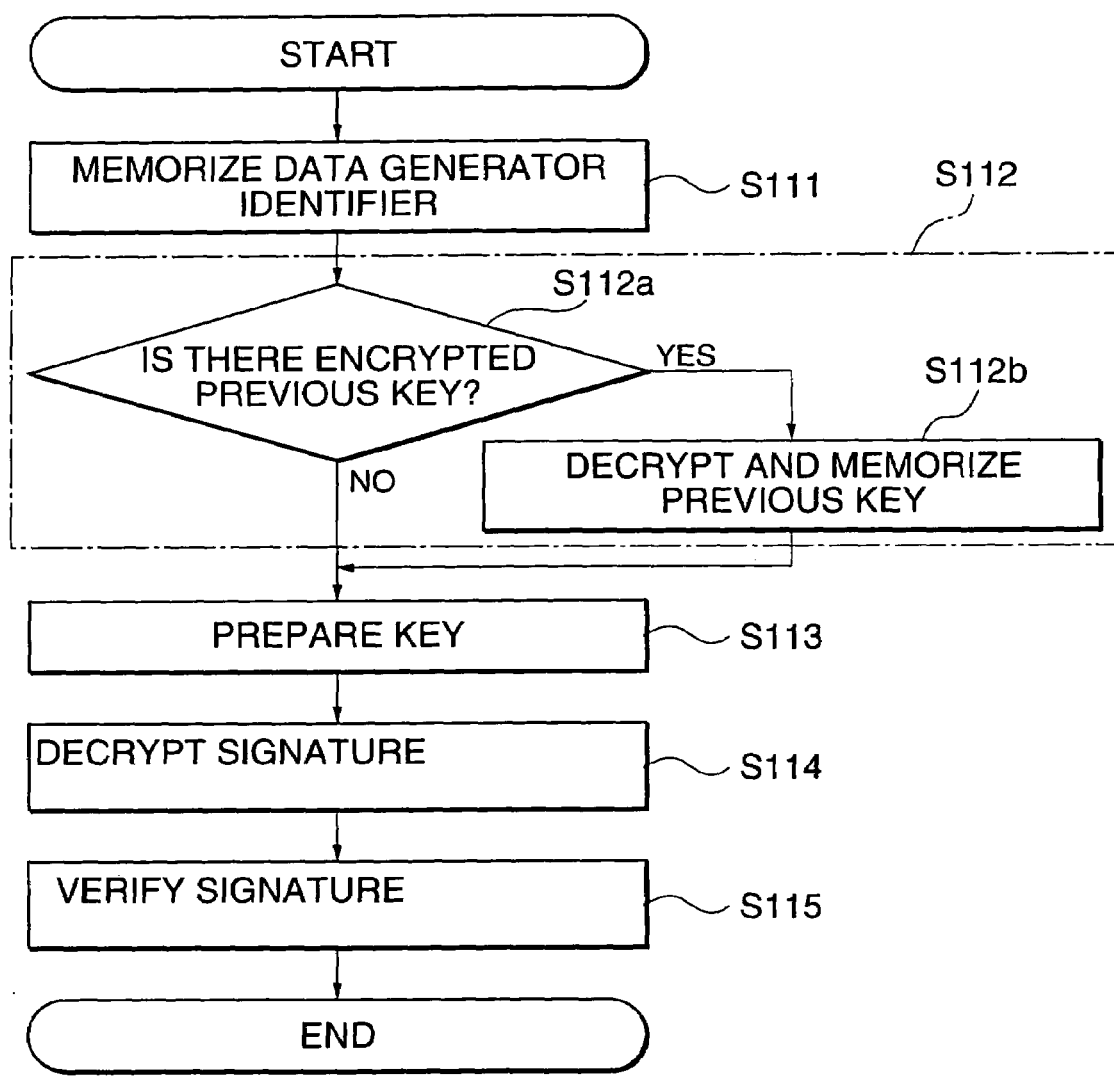
FIG. 3 is a flowchart for describing data verification by the first embodiment of the invention.

The operation of the data verifier 200 having received the signature data will be described below. The procedure of this operation is illustrated in the flowchart of FIG. 3.

[Step S111] The identifier of the data generator 100 having generated a signature is extracted from the signature data received by the receiver 202, and is stored into the key generation data memory unit 209.

[Step S112] If an encrypted previous key is included in the signature data, it is taken out and decrypted by the previous key decryptor 208, and the decrypted result is stored into the previous key memory unit 207. If no encrypted previous key is included, nothing is done here, and the procedure will go ahead to step S113.

[Step S113] The key generation unit 206 generates a key from the previous key stored in the previous key memory unit 207, the day and hour of requesting signature stored in the key generation data memory unit 209 and the identifier of the data generator 100 stored in the key generation data memory unit 209.

[Step S114] An encrypted signature is taken out of the signature data, and is decrypted by the decryptor 204 using a key generated by the key generation unit 206.

[Step S115] It is checked by the signature verification unit 205 whether or not the result of decrypting by the decryptor 204 is the correct signature of the data to be signed stored in the objective data memory unit 203.

If the data verifier 200 confirms by the checking at step S115 the correctness of the signature, the data verifier 200 is assured of the following:
1. The signature generated by the data generator 100 is the correct signature of the data to be signed stored in the objective data memory unit 203.
2. The day and hour of requesting signature sent by the data verifier 200 have reached the data generator 100 without being replaced by anything else.
3. The received identifier of the data generator 100 is the same as that of the data generator 100 having generated the signature.

Second Embodiment

Figure 4:
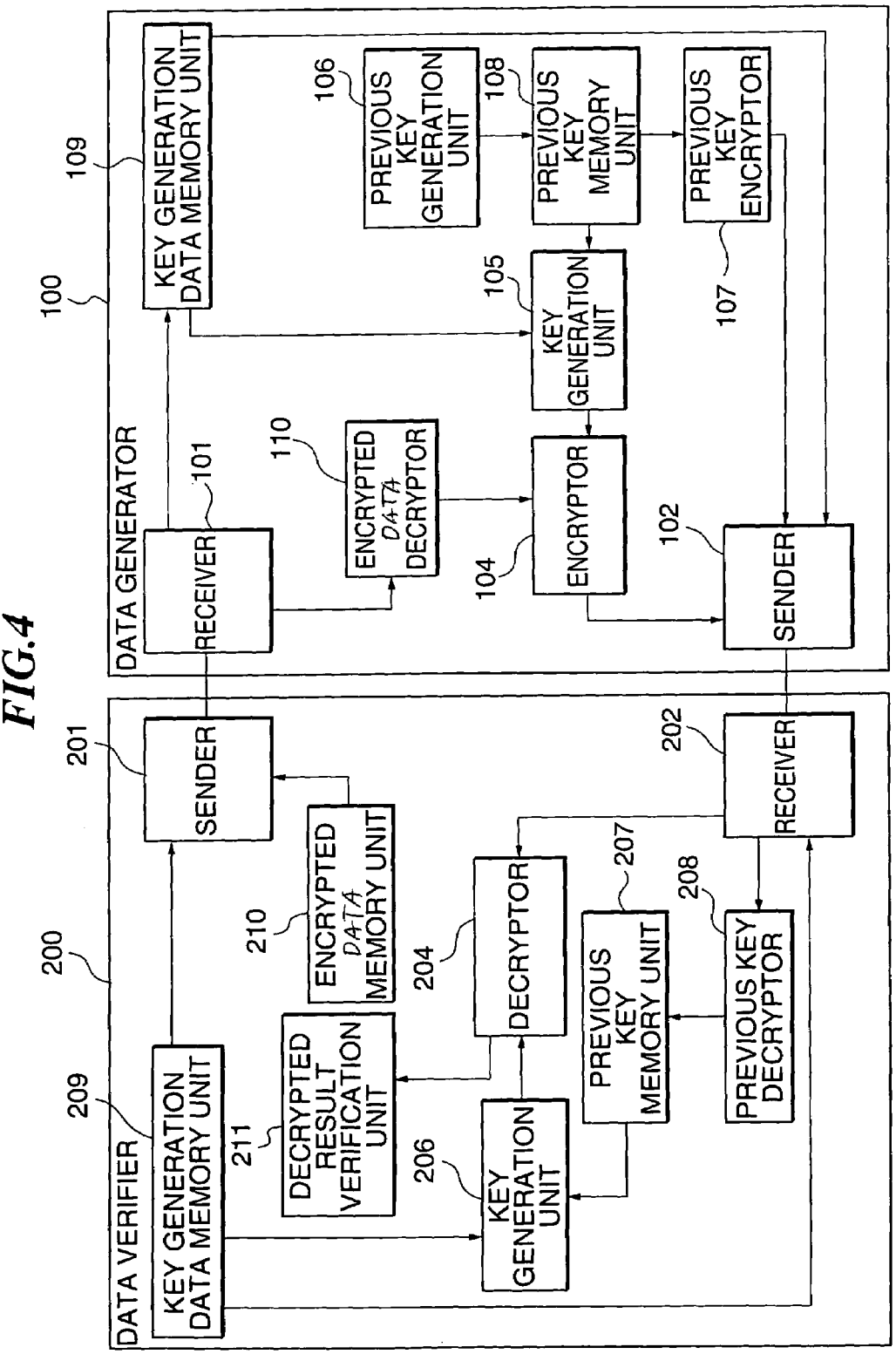
FIG. 4 is a block diagram illustrating the overall configuration of a second preferred embodiment of the invention.

FIG. 4 illustrates the configuration of a second preferred embodiment of the present invention.

This embodiment, like the first embodiment, is a system including a data generator 100 which generates data, and a data verifier 200 which verifies the integrity of the data generated by the data generator 100. Data is sent and received between the data generator 100 and the data verifier 200 possibly via the Internet, an intranet, a telephone line, by inter-process communication within the same computer or otherwise.

The basic functions are that an encrypted data sent by the data verifier 200 is decrypted by the data generator 100, and the result of decrypting is sent back to the data verifier 200.

It is also possible in this process of data sending/reception to send information from the data verifier 200 to the data generator 100 and to send information in the reverse direction. More specifically, information on the day and hour of requesting decrypting can be sent from the data verifier 200 to the data generator 100, and the identifier of the data generator 100 having executed the decrypting can be sent from the data generator 100 to the data verifier 200.

In this process, the data verifier 200 can confirm that the information it sent has reached the data generator 100 without being altered, that the data generator 100 having sent the information is the same data generator 100 that performed the decrypting, and that the data sent from the data generator 100 is not altered.

The roles of modules contained in the data generator 100 will be described below.

[Receiver 101] Receives data sent from the data verifier 200 and, after converting it from a communication format into a format within the data generator 100, allocates the received data to other modules within the data generator 100.

[Sender 102] Converts data received from different modules in the data generator 100 into a format suitable for communication, and sends the converted data to the data verifier 200.

[Encrypted data decryptor 110] This is a module to decrypt an encrypted data sent via the receiver 101 from the data verifier 200. In this embodiment, the decrypting algorithm used by this module is RSA. This module has a built-in decrypting key for RSA.

[Encryptor 104] This is a module to encrypt the decrypting result generated by the encrypted data decryptor 110. The encrypting performed by this module is DES-CBC (Data Encryption Standard-Cipher Block Chaining). This module has a built-in program capable of executing DES-CBC.

[Key generation unit 105] This is a module to generate an encrypting key for use by the encryptor 104. The encrypting key generated here includes 64 bits of initial vector for use by the encryptor 104 and 56 bits of the encrypting key for DES-CBC, i.e. 120-bit data in total. The data is the result of applying a one-way function outputting a 120-bit hash value to a previous key stored in a previous key memory unit 108 to be described below and data stored in a key generation data memory unit 109. Therefore, this module has a built-in program for executing the one-way function which outputs a 120-bit hash value.

[Previous key generation unit 106] This is a module to generate a previous key for use in generation of a key by the key generation unit 105. The previous key is generated using a random number generator or the like, so that the generated previous key cannot be foreseen by any aggressor.

The previous key is sent to the data verifier 200, and shared by the data generator 100 and the data verifier 200. As long as it is shared, there is no need to send the previous key to the data verifier 200. It is determined by the previous key generation unit 106 when to end the sharing and to send a new previous key to the data verifier 200. For this reason, the previous key generation unit 106 has a built-in clock, and generates a new previous key after a certain length of time has passed since the last sending of a previous key.

[Previous key encryptor 107] This is a module to encrypt a previous key, and to send the resultant encrypted previous key to the sender 102. Encrypting by this module uses RSA encrypting. The module has a program for executing RSA encrypting and an encrypting key built into it.

[Previous key memory unit 108] This is a module which stores a previous key generated by the previous key generation unit 106. The previous key stored in this module is referenced when the key generation unit 105 generates a key and when the previous key encryptor 107 encrypts a previous key.

[Key generation data memory unit 109] This is a module that stores data to be used when the key generation unit 105 generates a key. More specifically, the module stores information on the day and hour of requesting signature and the identifier of this data generator 100. The former data is sent from the data verifier 200. The latter data is embedded into this module, and sent via the sender 102 to the data verifier 200.

The roles of modules contained in the data verifier 200 will be described below.

[Sender 201] Converts data into a format suitable for communication, and sends the converted data to the data generator 100.

[Receiver 202] Receives data sent from the data generator 100 and, after converting them from a communication format into a format within the data verifier 200, allocates the received data to other modules within the data verifier 200.

[Encrypted data memory unit 210] This is a module that stores an encrypted data requesting decrypting to the data generator 100. The data stored herein is sent via the sender 201 to the data generator 100. The data accumulated here has resulted from the RSA encrypting of an unencrypted statement having a specific format, and its encrypting key matches the decrypting key built into the encrypted statement decryptor 110 of the data generator 100.

[Decryptor 204] This is a module that decrypts encrypted data contained in the data sent from the data generator 100. The decrypting performed here is of DES-CBC, and this module accordingly has a built-in program for executing DES-CBC.

[Decrypted result verification unit 211] This is a module which checks that the data decrypted by the decryptor 204 is the result of decrypting of the encrypted data whose decrypting was requested to the data generator 100. If the data is in a prescribed format, the correctness of the decryption performed by the data generator 100 is verified.

[Key generation unit 206] This is a module which generates a decrypting key for use by the decryptor 204. The decrypting key generated here includes 64 bits of initial vector and 56 bits of the decrypting key for DES-CBC, i.e. 120-bit data in total. The data is the result of applying a one-way function outputting a 120-bit hash value, the same hash value which the key generation unit 105 of the data generator 100 has, to a previous key stored in a previous key memory unit 207 to be described below and data stored in a key generation data memory unit 209. Therefore, this module has a built-in program for executing the one-way function, the same as that held by the key generation unit 105 of the data generator 100, which outputs the 120-bit hash value.

[Previous key memory unit 207] This is a module which stores a previous key decrypted by a previous key decryptor 208. The previous key stored in this module is referenced when the key generation unit 206 generates a key.

[Previous key decryptor 208] The previous key is sent in an encrypted form from the data generator 100. This module decrypts the encrypted previous key. Decrypting by this module uses RSA decrypting. The decrypting key for that is a decrypting key matching the encrypting key held by the previous key encryptor 107 of the data generator 100, and this module has this decrypting key built into it.

[Key generation data memory unit 209] This is a module which stores data for use in generation of a key by the key generation unit 206. More specifically, the module stores information on the day and hour of requesting decryption and the identifier of the data generator 100. The former data is taken out of a clock accompanying the data verifier 200. The latter data is sent from the data generator 100 together with an encrypted data.

The operations of this embodiment of the invention will be described below.

Roughly said, this embodiment takes steps that the data verifier 200 sends to the data generator 100 data including an encrypted data (hereinafter called a "decrypting request"), that the data generator 100 returns to the data verifier 200 data including the result of decrypting (hereinafter called "decrypted data"), and that the data verifier 200 checks the integrity of the decrypted data.

The operation that takes place when the data verifier 200 generates a decrypting request. The procedure itself is not illustrated because it is simple.

[Premise] The operation starts in a state wherein an encrypted data is stored in the encrypted data memory unit 210.

[Step 1] The data verifier 200 extracts current time information out of the clock built into it, and stores it into the key generation data memory unit 209 as the decrypting request time.

[Step 2] A decrypting request is generated from an encrypted data stored in the encrypted data memory unit 210 and the decrypting request time stored in the key generation data memory unit 209, and is sent from the sender 201 to the data generator 100.

Figure 5:
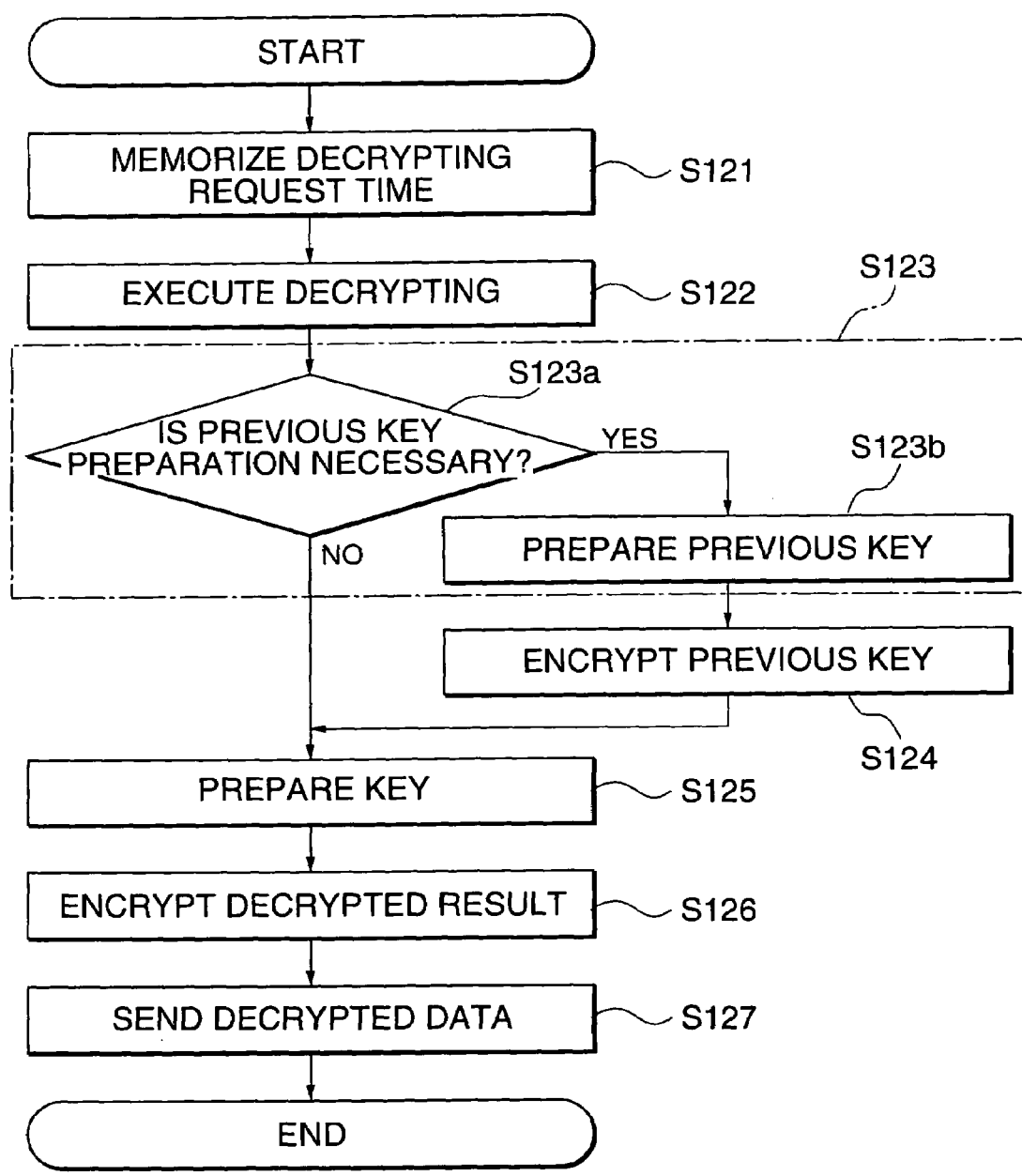
FIG. 5 is a flowchart for describing data decryption by the second embodiment of the invention.

The operation of the data generator 100 having received the decrypting request will be described below. The procedure of this operation is illustrated in the flowchart of FIG. 5.

[Step S121] The decrypting request time is taken out of the decrypting request received by the receiver 101, and stored into the key generation data memory unit 109.

[Step S122] The encrypted data is extracted from the decrypting request received by the receiver 101 and sent to the encrypted data decryptor 110, which decrypts the encrypted data.

[Step S123] If a new previous key has to be generated, the previous key generation unit 106 generates the previous key, and stores it into the previous key memory unit 108. If no new previous key is needed, the procedure will go ahead to step S125.

[Step S124] The previous key encryptor 107 encrypts the previous key stored in the previous key memory unit 108.

[Step S125] The key generation unit 105 generates a key from the previous key stored in the previous key memory unit 108, the day and hour of requesting decrypting stored in the key generation data memory unit 109 and the identifier of the data generator 100 stored in the key generation data memory unit 109.

[Step S126] The result of decrypting by the encrypted data decryptor 110 is encrypted by the encryptor 104, using the key generated by the key generation unit 105.

[Step S127] Decrypted data is generated from the encrypted result by the encryptor 104, a previous key, if any, encrypted by the previous key encryptor 107, and the identifier of this data generator 100 stored in the key generation data memory unit 109, and is sent from the sender 102 to the data verifier 200.

Figure 6:
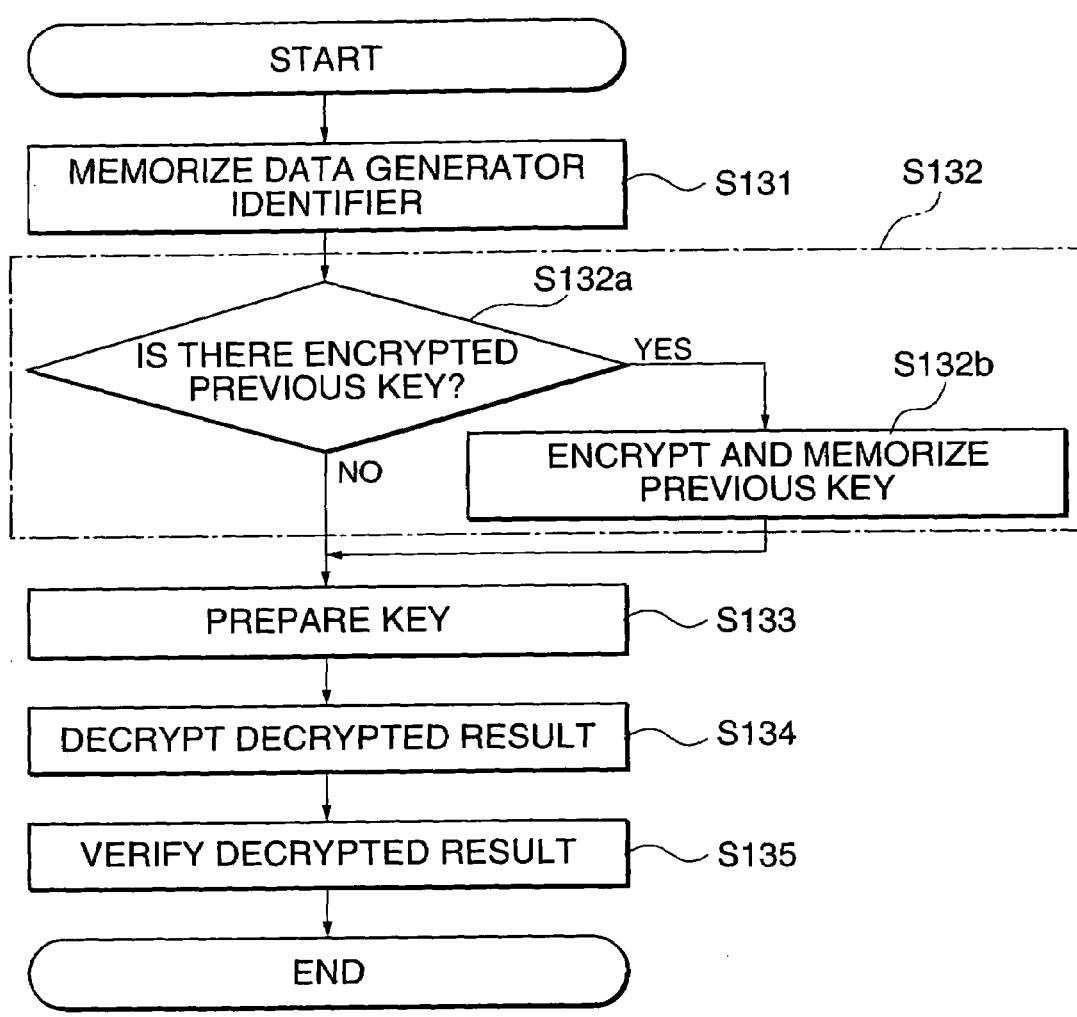
FIG. 6 is a flowchart for describing data verification by the second embodiment of the invention.

The operation of the data verifier 200 having received the decrypted data will be described below. The procedure of this operation is illustrated in the flowchart of FIG. 6.

[Step S131] The identifier of the data generator 100 having performed decrypting is extracted from the decrypted data received by the receiver 202, and is stored into the key generation data memory unit 209.

[Step S132] If an encrypted previous key is included in the decrypted data, it is taken out and decrypted by the previous key decryptor 208, and the decrypted result is stored into the previous key memory unit 207. If no encrypted previous key is included, nothing is done here, and the procedure will go ahead to step S133.

[Step S133] The key generation unit 206 generates a key from the previous key stored in the previous key memory unit 207, the day and hour of requesting decrypting stored in the key generation data memory unit 209 and the identifier of the data generator 100 stored in the key generation data memory unit 209.

[Step S134] An decrypted result of encrypted by the encryptor 104 is taken out of the decrypted data, and is decrypted by the decryptor 204 using a key generated by the key generation unit 206.

[Step S135] It is checked by the decrypted result verification unit 211 whether or not the result of decrypting by the decryptor 204 is data of a prescribed format.

If the data verifier 200 confirms by the checking at step S135 that the result of decrypting satisfies the prescribed format, the data verifier 200 is assured of the following:

1. The result of decrypting generated by the data generator 100 is correct.
2. The day and hour of requesting decrypting sent by the data verifier 200 has reached the data generator 100 without being replaced by anything else.
3. The received identifier of the data generator 100 is the same as that of the data generator 100 having executed the decrypting.

Incidentally, the prescribed format or pattern for the purpose of this embodiment may be any format or pattern. A pattern of an actual document can be used. For instance, parts having regularity may be considered the data for main checking, and other parts, the data for secondary checking. In such an HTML (Hypertext Markup Language) document as shown in FIG. 10, the header part can be used as the data for main checking, and the body part, the data for secondary checking. By checking on that basis the characteristics of the data for main checking, i.e. the header part, the integrity and identity of data between the data generator and the data verifier can be verified. In this case, by encrypting the header part or a section including the header part and sending it to the data generator and sending the remaining parts as data to be shared as they are, or causing them to be sent so, efficient sharing of data can be ensured.

This principle can be applied as well to other SGML (Standard Generalized Markup Language) documents than HTML documents such as XML (Extensible Markup Language) and other style sheets.

Further, as the characteristic of the data for main checking, a string of characters itself can be used. Thus it may be verified if the data for main checking contains a prescribed string of characters.

Third Embodiment

Figure 7:
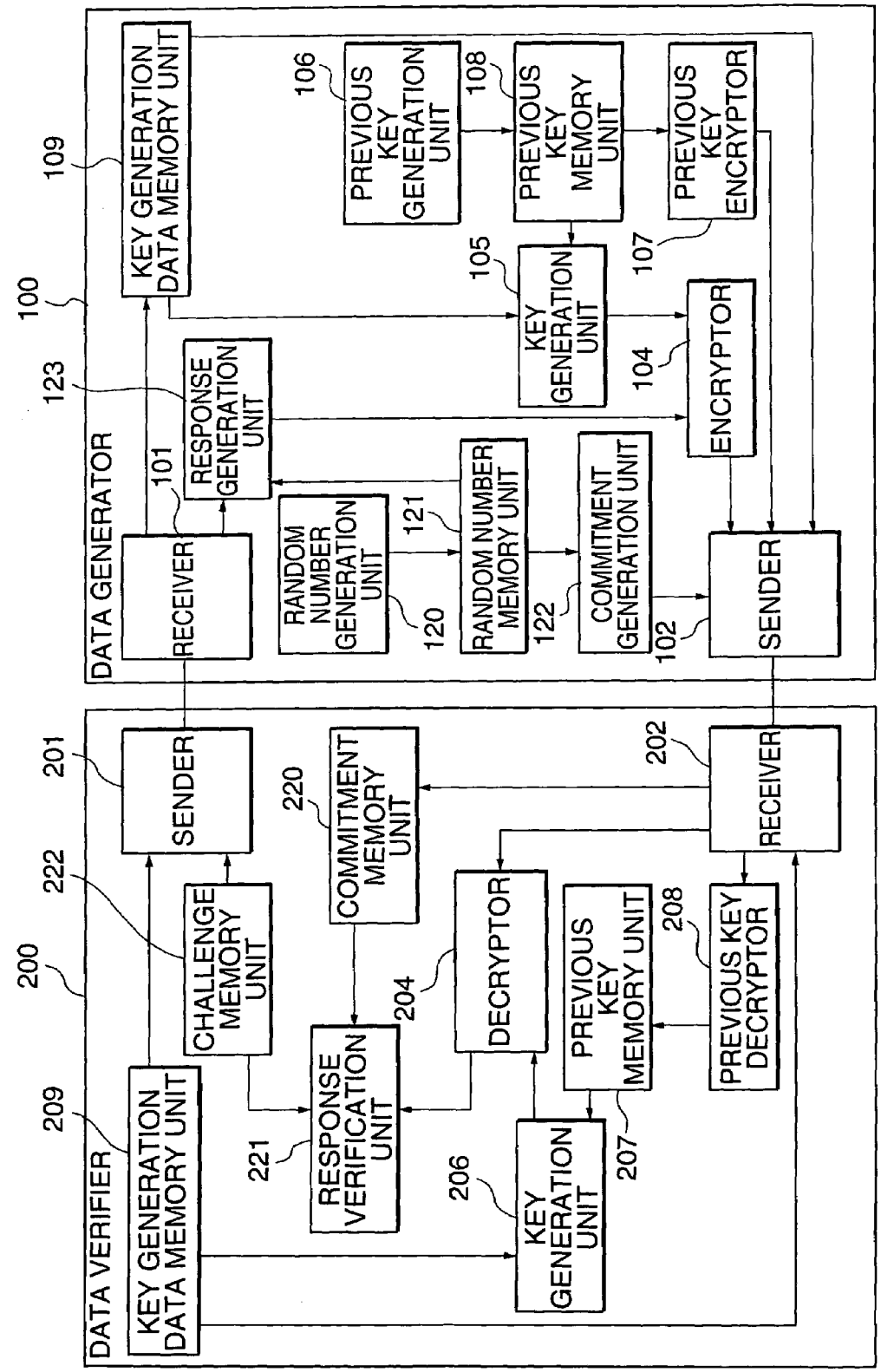
FIG. 7 is a block diagram illustrating the overall configuration of a third preferred embodiment of the invention.

FIG. 7 illustrates the configuration of a third preferred embodiment of the invention.

This embodiment is a system including a data generator 100 which generates data, and a data verifier 200 which verifies the integrity of the data generated by the data generator 100. Data is sent and received between the data generator 100 and the data verifier 200 possibly via the Internet, an intranet, a telephone line, by inter-process communication within the same computer or otherwise.

The basic functions are that the data verifier 200 authenticates the data generator 100. The data generator 100 generates and sends a commitment to the data verifier 200; the data verifier 200 sends a challenge to the data generator 100; and the data generator 100 calculates a response to the challenge and sends it back to the data verifier 200.

It is also possible in this process of data sending/reception to send information from the data verifier 200 to the data generator 100 and to send information in the reverse direction. More specifically, information on the day and hour of executing authentication can be sent from the data verifier 200 to the data generator 100, and the identifier of the data generator 100 having generated the response can be sent from the data generator 100 to the data verifier 200.

In this process, the data verifier 200 can confirm that the information it sent has reached the data generator 100 without being altered, that the data generator 100 having sent the information is the same data generator 100 that executed proving, and that the information is not altered.

The roles of modules contained in the data generator 100 will be described below.

[Receiver 101] Receives data sent from the data verifier 200 and, after converting them from a communication format into a format within the data generator 100, allocates the received data to other modules within the data generator 100.

[Sender 102] Converts data received from different modules in the data generator 100 into a format suitable for communication, and sends the converted data to the data verifier 200.

[Random number generation unit 120] This is a module to generate a random number that makes up the basis of a commitment.

[Random number memory unit 121] This is a module to store a random number generated by a random number generation unit 120.

[Commitment generation unit 122] This is a module to generate a commitment on the basis of a random number stored in the random number memory unit 121.

[Response generation unit 123] This is a module to generate a response to a challenge sent from the data verifier 200 via the receiver 101. In this embodiment, the data generator generates a response in accordance with the Guillou-Quisquater authentication system. When generating a response, not only a challenge but also a random number stored in the random number memory unit 121 is used.

[Encryptor 104] This is a module to encrypt the response generated by the response generation unit 123. The encrypting performed by this module is a remainder computation between the key generated by the key generation unit 105 and the response generated by the response generation unit 123 under the same modulus number used in the response generation unit 123.

[Key generation unit 105] This is a module to generate an encrypting key for use by the encryptor 104. This module includes a hash function such as SHA-1. Application of the hash function to a previous key stored in a previous key memory unit 108 to be described below and data stored in a key generation data memory unit 109 results in the encrypting key.

[Previous key generation unit 106] This is a module to generate a previous key for use in generation of a key by the key generation unit 105. The previous key is generated using a random number generator or the like, so that the generated previous key cannot be foreseen by any aggressor.

The previous key is sent to the data verifier 200, and shared by the data generator 100 and the data verifier 200. As long as it is shared, there is no need to send the previous key to the data verifier 200. It is determined by the previous key generation unit 106 when to end the sharing and to send a new previous key to the data verifier 200. For this reason, the previous key generation unit 106 has a built-in clock, and generates a new previous key after a certain length of time has passed since the last sending of a previous key.

[Previous key encryptor 107] This is a module to encrypt a previous key, and to send the resultant encrypted previous key to the sender 102. Encrypting by this module uses RSA encrypting. The module has a program for executing RSA encrypting and an encrypting key built into it.

[Previous key memory unit 108] This is a module which stores a previous key generated by the previous key generation unit 106. The previous key stored in this module is referenced when the key generation unit 105 generates a key and when the previous key encryptor 107 encrypts a previous key.

[Key generation data memory unit 109] This is a module that stores data to be used when the key generation unit 105 generates a key. More specifically, the module stores information on the day and hour of executing authentication and the identifier of this data generator 100. The former data is sent from the data verifier 200. The latter data is embedded into the data generator 100, and sent via the sender 102 to the data verifier 200.

The roles of modules contained in the data verifier 200 will be described below.

[Sender 201] Converts data into a format suitable for communication, and sends the converted data to the data generator 100.

[Receiver 202] Receives data sent from the data generator 100 and, after converting it from a communication format into a format within the data verifier 200, allocates the received data to other modules within the data verifier 200.

[Commitment memory unit 220] This module stores the commitment sent from the data generator 100. The data stored herein is referenced when the response verification unit 221 verifies a response.

[Challenge memory unit 222] In this module is stored a challenge which demands a response from the data generator 100. The data stored here is sent to the data generator 100 via the sender 201. It is referenced when the response verification unit 221 verifies a response.

[Decryptor 204] This is a module that decrypts an encrypted response contained in data sent from the data generator 100. The decrypting performed here is a computation to divide the encrypted response by a key generated by the key generation unit 206 under the same modulus number used for verifying a response by the response verification unit 221.

[Response verification unit 221] This is a module to verify the correctness of the response decrypted by the decryptor 204. This module checks if the response decrypted by the decryptor 204 is correct with respect to the commitment stored in the commitment memory unit 220 and the challenge stored in the challenge memory unit 222.

[Key generation unit 206] This is a module that generates a decrypting key for use by the decryptor 204. It includes the same hash function held by the key generation unit 105 of the data generator 100. The result of applying this hash function to the previous key stored in a previous key memory unit 207 to be described below and data stored in the key generation data memory unit 209 is the key.

[Previous key memory unit 207] This is a module which stores a previous key decrypted by a previous key decryptor 208. The previous key stored in this module is referenced when the key generation unit 206 generates a key.

[Previous key decryptor 208] The previous key is sent in an encrypted form from the data generator 100. This module decrypts the encrypted previous key. Decrypting by this module uses RSA decrypting. The decrypting key for that is matching the encrypting key held by the previous key encryptor 107 of the data generator 100, and this module has this decrypting key built into it.

[Key generation data memory unit 209] This is a module which stores data for use in generation of a key by the key generation unit 206. More specifically, the module stores information on the day and hour of executing authentication and the identifier of the data generator 100 having generated the response. The former data is taken out of a clock accompanying the data verifier 200. The latter data is sent from the data generator 100 together with the response.

The operations of this embodiment of the invention will be described below.

Roughly said, this embodiment takes such steps that the data generator 100 sends a commitment to the data verifier 200, that the data verifier 200 sends to the data generator 100 data including a challenge (hereinafter called "challenge data"), that the data generator 100 returns to the data verifier 200 data including a response (hereinafter called "response data"), and that the data verifier 200 checks the integrity of the response data.

The operation that takes place when the data generator 100 generates a commitment. This operation to generate a commitment is not illustrated because it is simple.

[Step 1] A random number for a commitment is generated by the random number generation unit 120, and stored into the random number memory unit 121.

[Step 2] A commitment is generated by the commitment generation unit 122 from a random number stored in the random number memory unit 121.

[Step 3] The generated commitment is sent to the data verifier 200 via the sender 102.

The operation of the data verifier 200 having received the commitment will be described below. The operation of the data verifier 200 then is not illustrated because it is simple.

[Step 1] The commitment received by the receiver 201 is stored into the commitment memory unit 220.

[Step 2] A challenge is generated and stored into the challenge memory unit 222.

[Step 3] Current time information is extracted from the clock built into the data verifier 200, and is stored into the key generation data memory unit 209 as the time of executing authentication.

[Step 4] Challenge data is generated from the challenge stored in the challenge memory unit 222 and the time of executing authentication stored in the key generation data memory unit 209, and sent to the data generator 100 via the sender 201.

Figure 8:
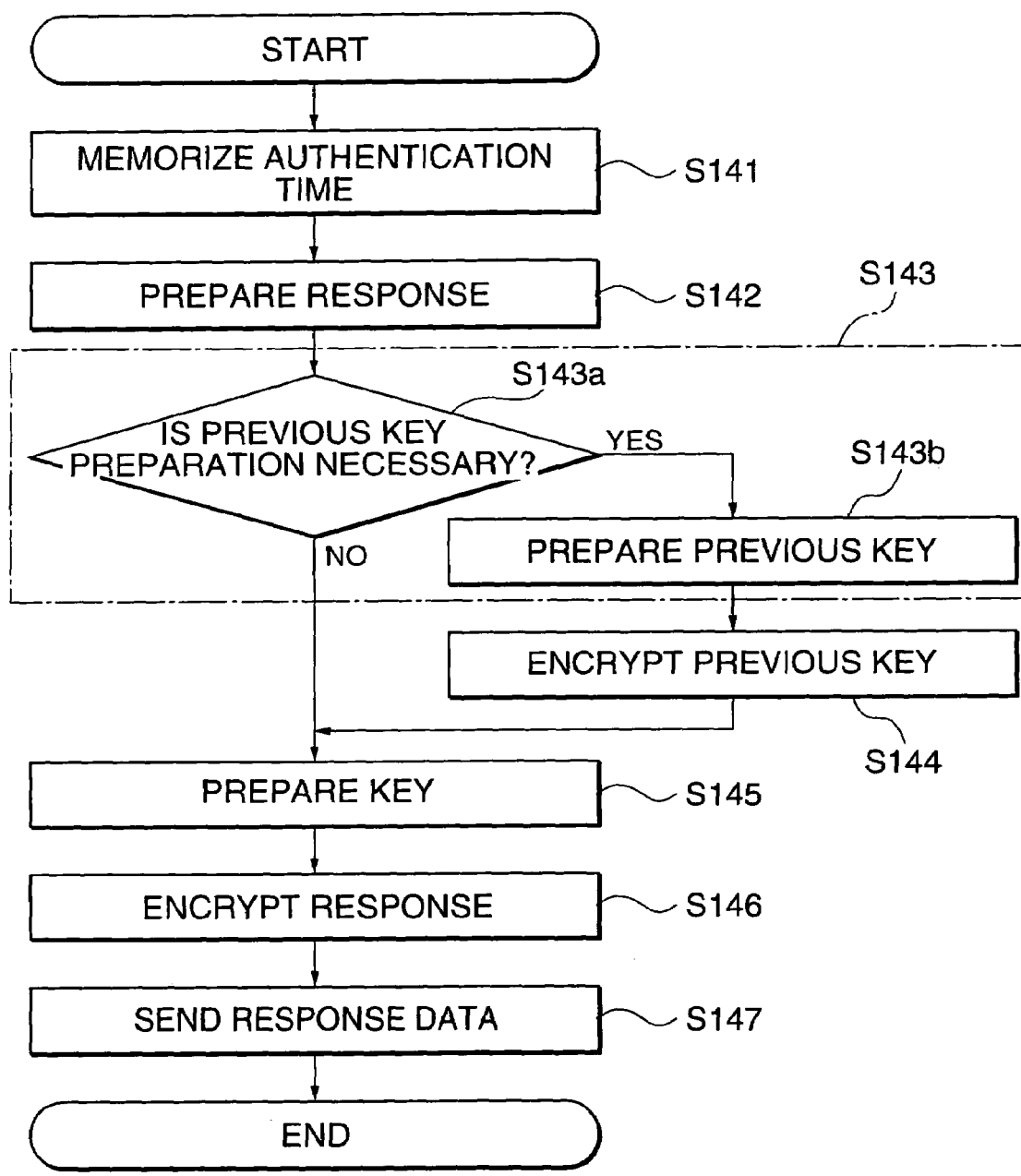
FIG. 8 is a flowchart for describing response generation by the third embodiment of the invention.

The operation of the data generator 100 having received the challenge data will be described below. The procedure of this operation is illustrated in the flowchart of FIG. 8.

[Step S141] The time of executing authentication is extracted from the challenge data received by the receiver 101, and stored into the key generation data memory unit 109.

[Step S142] The challenge is extracted from the challenge data received by the receiver 101 and sent to the response generation unit 123, which generates a response from the challenge and the random number stored in the random number memory unit 121.

[Step S143] If a new previous key has to be generated, the previous key generation unit 106 generates the previous key, and stores it into the previous key memory unit 108. If no new previous key is needed, the procedure will go ahead to step S145.

[Step S144] The previous key encryptor 107 encrypts the previous key stored in the previous key memory unit 108.

[Step S145] The key generation unit 105 generates a key from the previous key stored in the previous key memory unit 108, the day and hour of executing authentication stored in the key generation data memory unit 109 and the identifier of the data generator 100 stored in the key generation data memory unit 109.

[Step S146] The response generated by the response generation unit 123 is encrypted by the encryptor 104, using the key generated by the key generation unit 105.

[Step S147] Response data is generated from the response encrypted by the encryptor 104, a previous key, if any, encrypted by the previous key encryptor 107, and the identifier of this data generator 100 stored in the key generation data memory unit 109, and is sent via the sender 102 to the data verifier 200.

Figure 9:
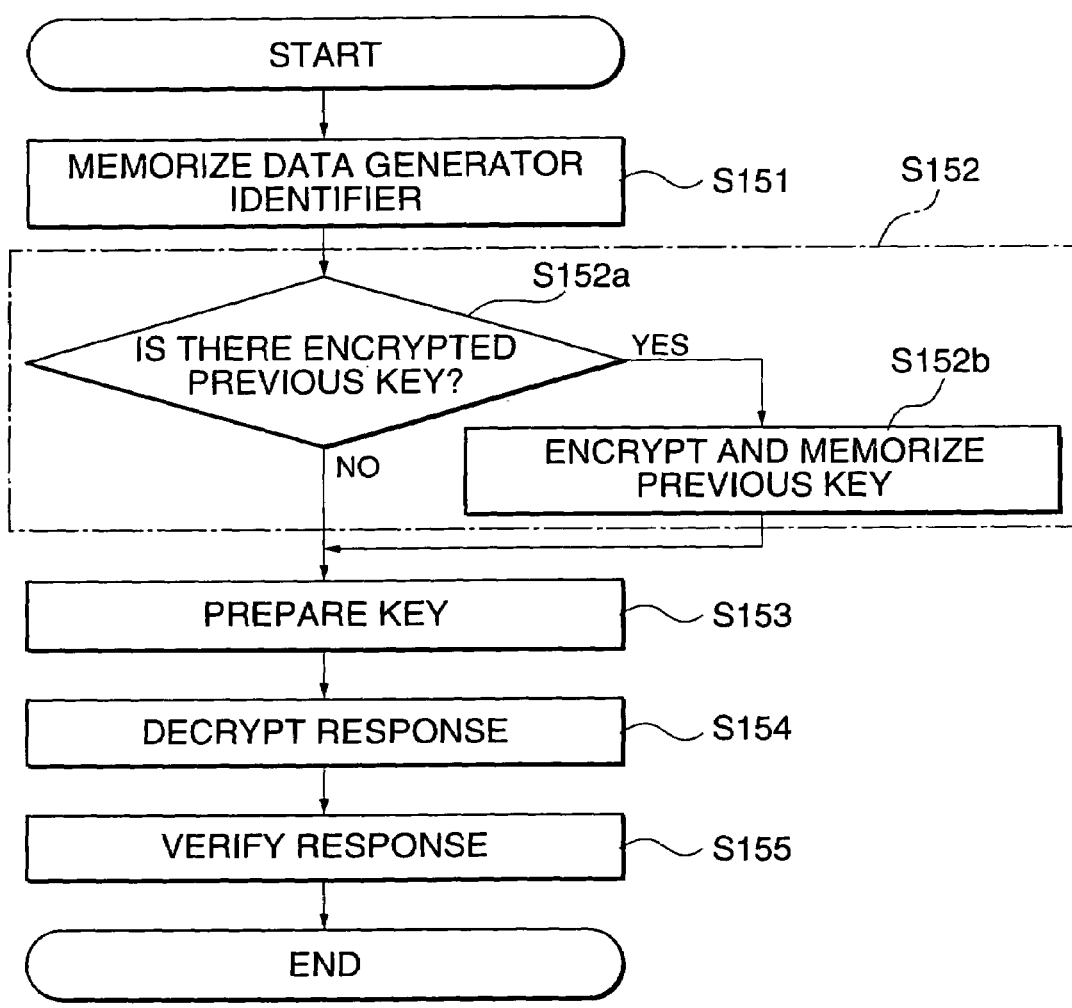
FIG. 9 is a flowchart for describing response verification by the third embodiment of the invention.

The operation of the data verifier 200 having received the response data will be described below. The procedure of this operation is illustrated in the flowchart of FIG. 9.

[Step S151] The identifier of the data generator 100 having generated the response is extracted from the response data received by the receiver 202, and is stored into the key generation data memory unit 209.

[Step S152] If an encrypted previous key is included in the response data, it is taken out and decrypted by the previous key decryptor 208, and the decrypted result is stored into the previous key memory unit 207. If no encrypted previous key is included, nothing is done here, and the procedure will go ahead to step S153.

[Step S153] The key generation unit 206 generates a key from the previous key stored in the previous key memory unit 207, the day and hour of executing authentication stored in the key generation data memory unit 209 and the identifier of the data generator 100 stored in the key generation data memory unit 209.

[Step S154] The encrypted response is taken out of the response data, and is decrypted by the decryptor 204 using the key generated by the key generation unit 206.

[Step S155] It is checked whether or not the result of decrypting by the decryptor 204 is a correct response with reference to the challenge stored in the challenge memory unit 222 and the commitment stored in the commitment memory unit 220.

If the data verifier 200 confirms by the checking at step S155 that a correct response has been obtained, the data verifier 200 is assured of the following:

1. The response generated by the data generator 100 is a correct response relative to the challenge and the commitment.
2. The day and hour of executing authentication sent by the data verifier 200 have reached the data generator 100 without being replaced by anything else.
3. The received identifier of the data generator 100 is the same as that of the data generator 100 having generated the response.

As hitherto described, according to the present invention, it is possible to check the integrity of data for secondary checking in connection with the procedure for the verification of data for main checking, and this procedure does not require addition of redundant data such as a MAC.

What is claimed is:

1. A data generating apparatus, comprising:
   a receiver that receives initial data and extracts first data and second data from the initial data;
   a key generation data memory unit that holds the second data;
   an encrypting key generation unit comprising a one-way function that generates an encrypting key from second data stored in the key generation data memory unit;
   an encryptor that encrypts the first data with the encrypting key generated by the encrypting key generation unit;
   a previous key memory unit that holds a previous key; and
   a sender that generates final data including at least one of the result of encrypting by the encryptor and the second data stored in the key generation data memory unit,
   wherein the encrypting key generation unit also uses the previous key stored in the previous key memory unit in generating the encrypting key.

2. A data generating apparatus according to claim 1, wherein the first data is a result of decrypting prescribed encrypted data.

3. A data generating apparatus according to claim 1, wherein the first data is a signature for prescribed data.

4. A data generating apparatus according to claim 1, wherein the encrypting key generation unit consists of a one-way function, and a result of inputting the second data stored in the key generation data memory unit into the one-way function is the encrypting key.

5. A data generating apparatus according to claim 1, further comprising:
   the previous key encrypting key memory unit that holds a previous key encrypting key for encrypting the previous key; and
   a previous key encryptor that encrypts the previous key with the previous key encrypting key stored in the previous key encrypting key memory unit.

6. A data generating apparatus according to claim 1, wherein the encrypting performed by the encryptor is symmetric key encrypting.

7. A data generating apparatus according to claim 1, wherein the encrypting performed by the encryptor is multiplication or division using the first data and the encrypting key generated by the encrypting key generation unit under a prescribed modulus number.

8. A data generating method comprising the steps of:
   receiving initial data and extracting first data and second data from the initial data;
   generating an encrypting key from the second data using a one-way function;
   encrypting the first data with the encrypting key, the first data capable of being checked whether it includes a prescribed characteristic; and
   generating final data including at least one of the second data and the encrypted first data,
   wherein the encrypting key is also generated from a previous key stored in a previous key memory unit.

9. A data verifying apparatus, comprising:
   a receiver that receives initial data and extracts first data and second data from the initial data;
   a key generation data memory unit that holds the second data;

a decrypting key generation unit comprising a one-way function that generates a decrypting key from the second data stored in the key generation data memory unit;

a decryptor that decrypts the first data with the decrypting key generated by the decrypting key generation unit;

a verification unit that checks whether the first data decrypted by the decryptor has a prescribed characteristic and checks whether the decrypted first data is a result of decrypting prescribed data with a prescribed decrypting key; and a previous key memory unit that holds a previous key, wherein the decrypting key generation unit, in generating a decrypting key, also uses the previous key stored in the previous key memory unit.

10. A data verifying apparatus according to claim 9, wherein the verification unit checks whether the data decrypted by the decryptor is a signature signed with a prescribed signature key.

11. A data verifying apparatus according to claim 9, wherein the decrypting key generation unit consists of a one-way function, and a result of inputting the second data stored in the key generation data memory unit into the one-way function is the decrypting key.

12. A data verifying apparatus according to claim 9, further comprising:

the previous key memory unit that stores an encrypted previous key;

a previous key decrypting key memory unit that stores a decrypting key for decrypting the encrypted previous key; and a previous key decryptor that decrypts the encrypted previous key stored in the previous key memory unit with the decrypting key stored in the previous key decrypting key memory unit.

13. A data verifying apparatus according to claim 9, wherein the decrypting performed by the decryptor is decrypting in symmetric key algorithm.

14. A data verifying apparatus according to claim 9, wherein the decrypting performed by the decryptor is multiplication or division using the first data and the decrypting key generated by the decrypting key generation unit under a prescribed modulus number.

15. A data verifying method comprising the steps of:

receiving initial data and extracting first data and second data from the initial data;

generating a decrypting key from second data using a one-way function;

decrypting first data with the decrypting key; and checking whether a result of decrypting includes a prescribed characteristic, wherein the second data is also generated from a previous key stored in a previous key memory unit.

16. A data processing apparatus comprising a data generating apparatus and a data verifying apparatus for verifying the integrity of encrypted data generated by the data generating apparatus, wherein:

the data verifying apparatus further comprises:

a receiver that receives the encrypted data from the data generating apparatus;

a reference value data memory unit that holds first data;

a first key generation data memory unit that holds second data;

a decrypting key generation unit comprising a one-way function that generates a decrypting key from the second data stored in the first key generation data memory unit;

a decryptor that decrypts the encrypted data received from the data generating apparatus with the decrypting key generated by the decrypting key generation unit; and a verification unit that checks whether the data decrypted by the decryptor has a prescribed relationship with respect to integrity with the first data stored in the reference value data memory unit, and the data generating apparatus further comprises:

a receiver that receives the first data from the data verifying apparatus and that generates third data from the first data;

a second key generation data unit that holds fourth data;

an encrypting key generation unit that comprises a one-way function for generating an encrypting key from the fourth data stored in the second key generation data memory unit; and an encryptor that encrypts the third data with the encrypting key generated by the encrypting key generation unit; and a sender that sends the encrypted third data to the data verifying apparatus.

17. A data processing apparatus according to claim 16, wherein the third data generated by the data generating apparatus is a result of decrypting with a prescribed decrypting key the first data from the data verifying apparatus, and the verification unit of the data verifying apparatus checks whether the result of decrypting of encrypted data from the data generating apparatus is a result of decrypting the first data.

18. A data processing apparatus according to claim 16, wherein the third data generated by the data generating apparatus is a signature generated by signing the first data sent from the data verifying apparatus with a prescribed signature key, and the verification unit of the data verifying apparatus checks if a result of decrypting the encrypted data sent from the data generating apparatus is a correct signature with respect to the first data.

19. A data processing apparatus according to claim 16, wherein the data generating apparatus further comprises:

a commitment random number memory unit that holds a random number; and a commitment generation unit that generates a commitment from the random number stored in the commitment random number memory unit, and the data verifying apparatus further comprises:

a commitment memory unit that stores the commitment sent from the data generating apparatus, wherein the data generating apparatus sends, before it receives the first data from the data verifying apparatus, the commitment generated by the commitment generation unit to the data verifying apparatus, the receiver also uses a random number stored in the commitment random number memory unit for generating the third data to be verified, and the data verifying apparatus, when the verification unit performs checking, also uses the commitment stored in the commitment memory unit.

20. A data processing apparatus according to claim 16, wherein the decrypting key generation unit of the data verifying apparatus consists of a one-way function, a result of entering the data stored in the first key generation data memory unit into the one-way function is the decrypting key, the encrypting key generation unit of the data generating apparatus is composed of the same one-way function as that of the decrypting key generation unit of the data verifying apparatus, and a result of entering the data stored in the second key generation data unit into the one-way function is the encrypting key.

21. A data processing apparatus according to claim 16, wherein the data verifying apparatus further comprises:
    a first previous key memory unit that holds a previous key, and
    the decrypting key generation unit, when it is to generate the decrypting key, also uses the previous key stored in the first previous key memory unit, and
    the data generating apparatus further comprises:
    a second previous key memory unit that holds the previous key, and
    the encrypting key generation unit, when it is to generate the encrypting key, also uses the previous key stored in the second previous key memory unit.

22. A data processing apparatus according to claim 21, wherein:
    the data generating apparatus further comprises:
        a previous key encrypting key memory unit that stores a previous key encrypting key for encrypting the previous key; and
        a previous key encryptor that encrypts the previous key with an encrypting key stored in the previous key encrypting key memory unit, and
    the data verifying apparatus further comprises:
        a previous key decrypting key memory unit that encrypts a previous key decrypting key for decrypting the encrypted previous key; and
        a previous key decryptor for decrypting the encrypted previous key with a previous key decrypting key stored in the previous key decrypting key memory unit, wherein
    the data generating apparatus encrypts the previous key stored in the second previous key memory unit with the previous key encryptor using the encrypting key stored in the previous key encrypting key memory unit, and sends the result to the data verifying apparatus, and
    the data verifying apparatus decrypts the encrypted previous key sent from the data generating apparatus with the previous key decryptor using the decrypting key stored in the previous key decrypting key memory unit, and stores the result in the first previous key memory unit.

23. A data processing apparatus according to claim 16, wherein
    the data verifying apparatus sends data held in the first key generation data memory unit to the data generating apparatus, and
    the data generating apparatus stores the data sent from the data verifying apparatus in the second key generation data memory unit for use in generation of the encrypting key.

24. A data processing apparatus according to claim 16, wherein
    the data generating apparatus sends the fourth data held in the second key generation data memory unit to the data verifying apparatus, and the data verifying apparatus stores the fourth data from the data generating apparatus in the first key generation data unit for use in generation of the decrypting key.

25. A data processing apparatus according to claim 16, wherein the encrypting performed by the encryptor is the encrypting using a symmetric key algorithm with the encrypting key, and the decrypting performed by the decryptor is the decrypting using a symmetric key algorithm with the decrypting key.

26. A data processing apparatus according to claim 16, wherein the encrypting performed by the encryptor is multiplication or division using the third data and the encrypting key under a prescribed modulus number, and the decrypting performed by the decryptor is multiplication or division using the encrypted data from the data generating apparatus by the decrypting key under the same modulus number used in the encryptor.

* * * * *